United States Patent [19]

Hirose et al.

[11] Patent Number: 4,896,313
[45] Date of Patent: Jan. 23, 1990

[54] OPTICAL INFORMATION RECORDING MEDIUM UTILIZING PITS HAVING A SHARP FRONT FACE AND METHOD OF MANUFACTURING THE SAME

[75] Inventors: Atsuki Hirose, Ibaraki; Tamotu Iida, Tsuchiura, both of Japan

[73] Assignee: Hitachi Maxell, Ltd., Ibaraki, Japan

[21] Appl. No.: 71,349

[22] Filed: Jul. 9, 1987

[30] Foreign Application Priority Data

Jul. 10, 1986 [JP]  Japan ................................. 61-160712

[51] Int. Cl.$^4$ ............................................... G11B 7/24
[52] U.S. Cl. ..................................... 369/275; 369/109; 369/111
[58] Field of Search ................ 369/275, 100, 284, 286, 369/109, 111, 120, 121, 127; 346/135.1, 762; 235/487, 488

[56] References Cited

U.S. PATENT DOCUMENTS

| | | | |
|---|---|---|---|
| 4,037,251 | 7/1977 | Bricot et al. | 369/109 |
| 4,152,726 | 5/1979 | Kojima et al. | 369/275 |
| 4,646,103 | 2/1987 | Sugiyama et al. | 369/109 |
| 4,787,075 | 11/1988 | Matsuoka et al. | 369/44 |

FOREIGN PATENT DOCUMENTS 61-214149  9/1986  Japan ................................... 369/275

Primary Examiner—Alan Faber
Assistant Examiner—Hoa T. Nguyen
Attorney, Agent, or Firm—Antonelli, Terry & Wands

[57] ABSTRACT

An optical information recording medium having a sharp front face of an optical information recording pit to thereby reduce jitter of a reproduced optical signal. The front and back end portions of a pit are made to have a sharp edge and a wider portion. In a cutting operation for an original medium used for mass production of medium, the light exposure amount to a photoresist on the original medium is controlled to increase it at the front and back edge portions of a pit.

25 Claims, 11 Drawing Sheets

OPTICAL INFORMATION RECORDING MEDIUM UTILIZING PITS HAVING A SHARP FRONT FACE AND METHOD OF MANUFACTURING THE SAME

BACKGROUND OF THE INVENTION

The present invention relates to an optical information recording medium for recording/reproducing optical information by applying a radiation beam to the medium, and to a method of manufacturing such an optical information recording medium.

The prior art optical information recording pits are disclosed in the U.S. Pat. Nos. 3,999,008, 4,238,803, 4,278,756 and 4,360,728 and the Japanese Patent Kokoku Sho. 56-23221.

An optical information recording medium stores a record signal (e.g., information signal and address signal) on one side of a transparent substrate made of glass or transparent hard plastics, in the form of pits (e.g., recess). The positions of pits are optically detected to reproduce the signal recorded on the medium.

Figure 8:
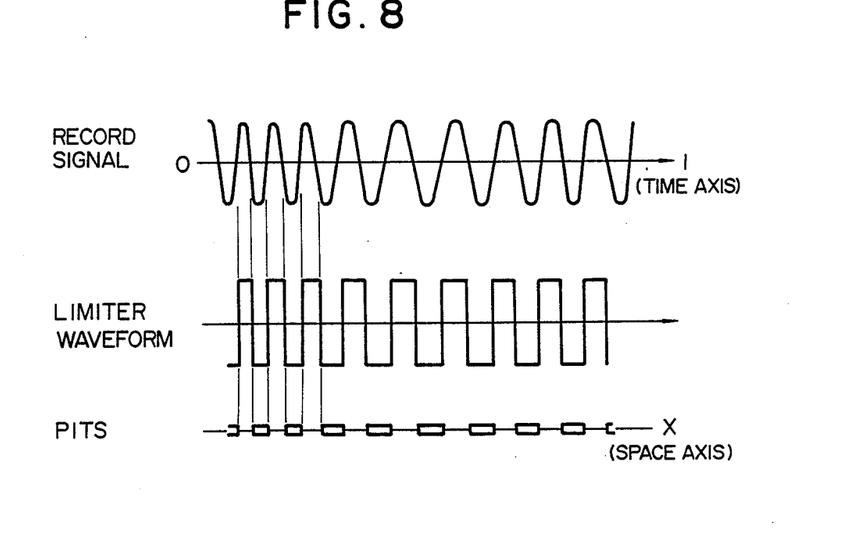
FIG. 8 shows a relationship between a record signal and pits formed on an optical information recording disk.
Figure 9A:
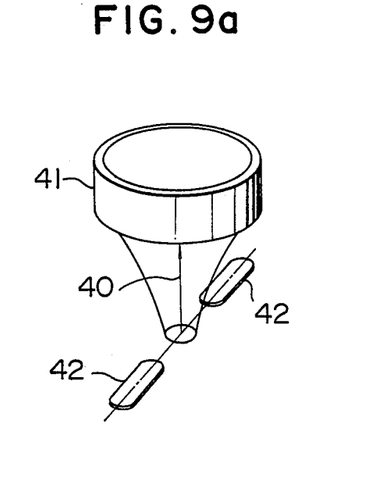
FIGS. 9a and 9b are perspective views illustrating the principle of an optical information recording disk.
Figure 9B:
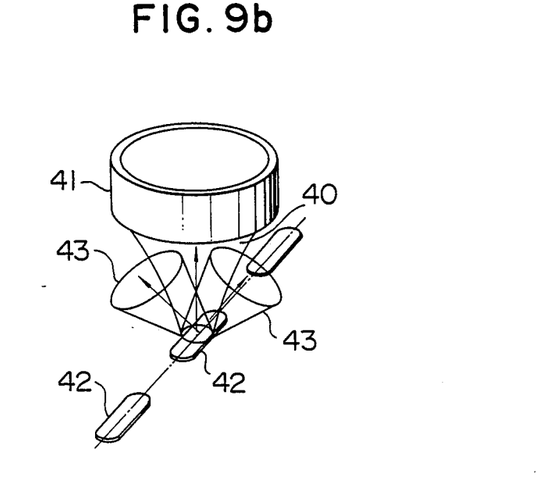

Specifically, on the record surface of an optical information recording medium, there are formed a consecutive series of pits in the circumferential direction of the medium as shown in FIG. 8. Each pit has a front edge corresponding to a rise of a limiter waveform obtained by limiting a record signal, and a back edge corresponding to a fall of the limiter waveform. By applying a reproducing radiation beam to the series of pits, the front and back edges of pits can be detected based on a difference in intensity of lights reflected from a pit and reflected from the other area. Then, a limiter waveform can be obtained based on the detected front and back edges and hence a record signal can be reproduced. The above process will be described in more detail. As shown in FIG. 9a a reproducing radiation beam 40 applied to the area other than a pit is totally reflected by a reflective film (not shown) formed at the back of an optical information recording medium. All the reflected light fluxes are returned to the aperture of an objective lens 41. On the other hand, as shown in FIG. 9b, a reproducing radiation beam 40 applied to a pit 42 is diffracted by the pit 42 to produce diffracted light fluxes 43 having a large reflective angle. Most of the diffracted light fluxes 43 are directed outside the aperture of the objective lens 41 so that the light quantity of fluxes returned to the objective lens 41 decreases. In addition, the light amount is further decreased by the interference effect caused by the light fluxes returned to the aperture from the pit 42. Such a difference in light amount is detected by a detector such as a photodiode so that the presence/absence and length of the pit 42 can be detected to thus read the information stored in the optical information recording medium.

The amount of light reflected from a pit depends on the pit size. Although a detailed calculation is omitted, a difference in amount of lights reflected from a pit and from the other area becomes maximum the nearer the pit area becomes to that of the reproducing laser spot, assuming that the pit depth is $\lambda ml/4nl$ (ml is an integer) where nl is a refraction index of a transparent substrate and $\lambda$ is the wavelength of a reproducing laser beam.

Such an optical information recording medium, for example an optical disk is manufactured by the transfer technique using an original optical disk on which recesses substantially the same as those pits to be formed on the optical information disk have been formed. In a known method for cutting pits on an original optical disk, a radiation beam modulated by a recording signal is applied through a cutting head to a photoresist coating the surface of the disk in uniform thickness, while rotating the disk and moving the cutting head in the radial direction of the disk, to thereby obtain exposed pits corresponding to the pattern of the applied radiation beam.

Figure 10:
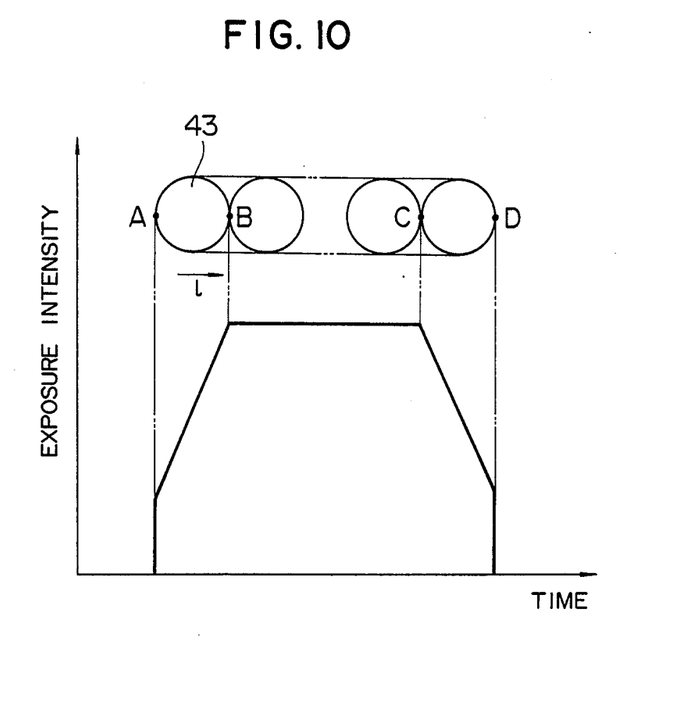
FIG. 10 is a graph showing the intensity distribution of light exposure to a photoresist while a radiation spot of a constant intensity is applied the photoresist at a constant linear velocity.

Assuming that the light intensity distribution within a radiation spot is uniform, the light exposure amount to a photoresist is proportional to the product of a cutting radiation beam intensity and the beam application time. Therefore, assuming that a cutting radiation beam of constant intensity is applied to the photoresist layer at a constant linear velocity, the light exposure amount to the photoresist varies with time as shown in FIG. 10. Namely, the light exposure amount to the photoresist is small at the start point A where a radiation spot 43 starts to be applied because of a very short application time. Between the start point A and the following point B spaced apart from the point A by the spot diameter d, the light exposure amount to the photoresist becomes gradually large in proportion to the move distance l of the radiation spot 43 because the application time becomes correspondingly longer. Between the point B and the following point C, the exposure time of the photoresist is maintained constant because the beam spot application time is constant, i.e., the time being from when the front edge of the radiation spot 43 reaches a certain point to when the back edge passes that point. The exposure amount at the point C, spaced apart from the point D by the radiation spot 43 diameter d, is maximum, whereas between the points C and D, the light exposure amount to the photoresist gradually decreases in proportion to the move amount of the spot because the application time becomes correspondingly shorter.

In practice, the intensity distribution of a radiation spot 43 is not uniform, but it takes a Gaussian distribution where the central area has a highest intensity and the peripheral area has a gradually decreased intensity. Therefore, the light exposure amount to the photoresist of the radiation spot 43 at the start and end points A and D further decreases.

Figure 11:
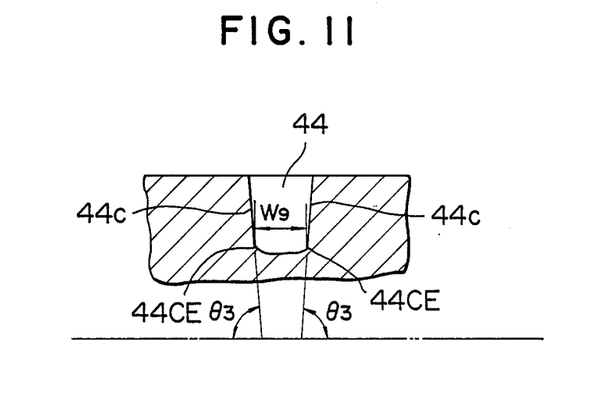
FIG. 11 is a cross section showing a side configuration of a pit while a radiation spot of a constant intensity is applied to a photoresist at a constant velocity.
Figure 12:
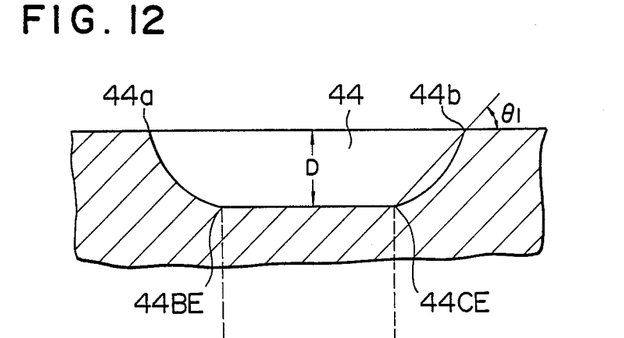
FIG. 12 is a cross section showing a front and back configuration of a pit while a radiation spot of a constant intensity is applied to a photoresist at a constant velocity.
Figure 13:
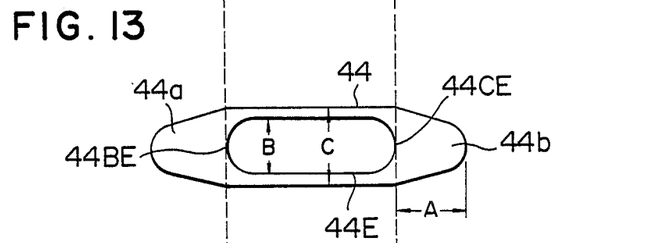
FIG. 13 is a plan view showing the plan configuration of a pit.

The size and depth of a pit after cutting through a photoresist is generally proportional to the radiation beam exposure amount to the photoresist. Therefore, with a smaller light exposure amount at the light application start and end points and a larger light exposure amount at the intermediate area, the sectional configuration of a pit 44 formed after the development of the photoresist has a sharp side face 44c as shown in FIG. 11 and gentle front and back end portions 44a and 44b as shown in FIG. 12. The plane configuration of the pit 44 has a wider intermediate portion and narrower front and back end portions 44a and 44b as shown in FIG. 13. The typical values of the lengths A, B and C for the configuration are 0.09 to 0.11 $\mu$m, 0.35 to 0.38 $\mu$m and 0.52 to 0.55 $\mu$m, respectively.

An area where the pit after cutting has a constant depth is between the points B and C shown in FIG. 10, the area corresponding to the area from 44BE to 44CE shown in FIG. 12, and the shape thereof is shown in FIG. 13 at 44E. In case where the pit and the other area are distinguished by a detector such as a photodiode which detects a difference in amount of reflected lights, the detector is arranged to detect the depth difference between plane position 44a and depth position 44BE and the depth difference between plane position 44b and depth position 44CE, as shown in FIGS. 12 and 13. Consequently, the longer the distance from the 44a position to 44BE position or from the 44CE position to 44b position where the depth is not constant and gradually changes, the more the pit detection becomes incorrect. Thus, a bit detection error may occur and a C/N ratio for reproducing recorded information is degraded. The mean value of the depth D is 0.12 to 0.13 μm and the angle $\theta_1$ is 45 to 53 degrees.

Figure 15:
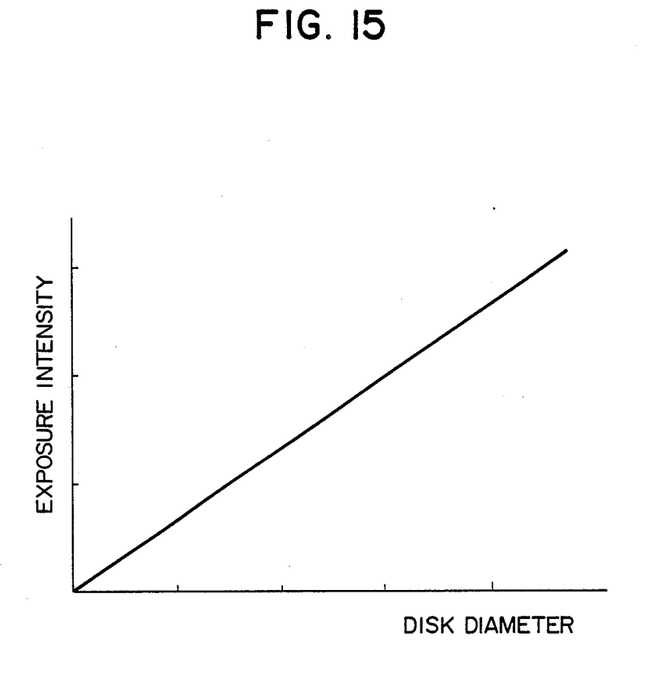
FIG. 15 is a graph showing a light exposure intensity relative to a disk diameter.

Apart from the above, since the substrate of an original optical disk is rotated at a constant angular velocity relative to a cutting head, the relative speed between the photosensitive surface of the disk and a laser spot radiated from the cutting head becomes high in proportion to the distance from the rotation center of the substrate to the radiation center of a laser spot. In view of this, in a conventional cutting method, the light exposure intensity to a pit is changed in proportion to a distance from the rotation center of the disk to the radiation center of a laser spot, as shown in FIG. 15.

Figure 14:
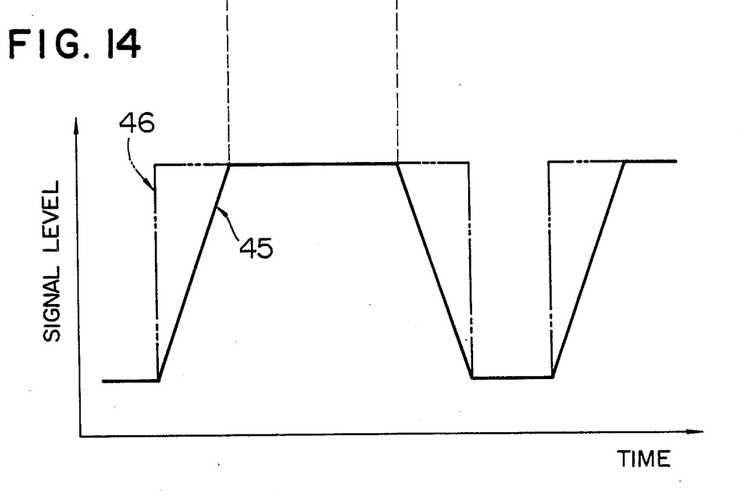
FIG. 14 is a graph showing a signal level change with time.

As previously described, the amount of reproducing radiation light reflected from a pit depends on the pit size. Although a detailed calculation is omitted, a difference in amount of lights reflected from a pit and from the other area becomes maximum when the pit depth is λml/4nl (ml is an integer) and the pit depth W is about one third of the diameter 2w of the reproducing radiation spot, where nl is a refraction index of the disk and λ is the wavelength of a reproducing laser beam. If a pit whose depth becomes gradually larger in the direction of movement a reproducing radiation beam as shown in FIG. 12 is read, the resultant signal waveform 45 becomes as shown in FIG. 14 which has gentle rising and falling edges as compared with an ideal pulse waveform 46. As a result, problems such as a large jitter of a readout signal and a poor C/N ratio arise.

If a high intensity cutting radiation beam is exposed to a photoresist for the formation of pits, a uniform pit width can be ensured from the front end portion 44a to back end portion 44b of the pit 44, and in addition a sharp configuration of the front and back end portions 44a and 44b can be ensured. Thus, the problems of gentle rising and falling edges of a readout signal can be eliminated. However, if such a high intensity cutting radiation beam is continuously exposed from the application start point A to the end point D, the pit width at the intermediate portion becomes large so that it becomes impossible to form a pit width most suitable for a signal modulation degree decided by a reproducing laser spot diameter. Further, this large pit width hinders the technical subject of a small pit size and an improved recording density.

Figure 16A:
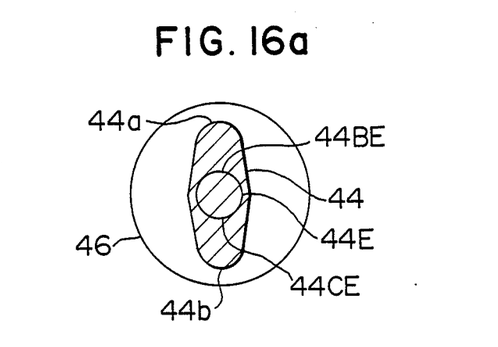
FIGS. 16a to 16c shows a relationship between a radiation beam spot size and a pit configuration.
Figure 16B:
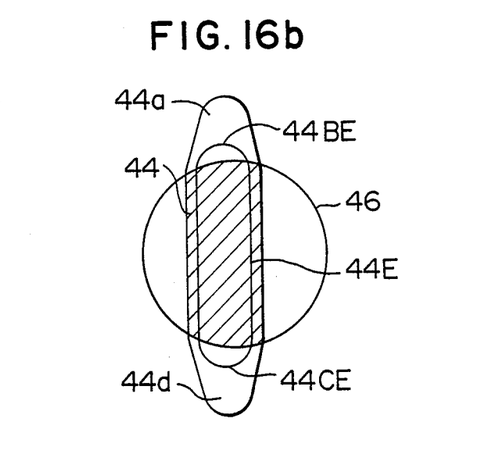
Figure 16C:
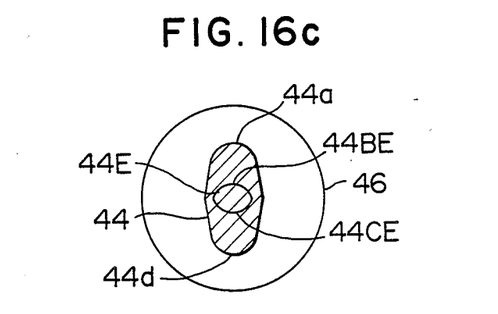

Apart from the above, the pit length is now made shorter to improve the recording density. Therefore, of pits for a record signal having long and short wavelengths, a pit whose length is smaller than a reproducing laser spot diameter will probably be present. Particularly, the area in a reproducing radiation laser spot occupied by a pit having a shorter length than the laser spot diameter becomes smaller than that occupied by a pit having a larger length, respectively as shown in FIGS. 16a and 16b. In this case, a signal level reproduced from such a disk becomes small due to the lowered efficiency of interference and diffraction of the laser beam, resulting in difficulties in reading the information. This problem becomes more dominant as the pit shape becomes smaller as shown in FIG. 16c. The reason for this is that as shown in FIGS. 16a to 16c, the area at the pit bottom 44E becomes very small as compared with that at the upper pit plane 44, the ratio of the areas between 44a and 44BE and between 44b and 44CE where the pit depth is not constant but changes gently, to the entire area of the pit 44 becomes very large. Therefore, it is difficult in practice to use a pit 44 having a shorter length than that of a reproducing laser spot diameter.

SUMMARY OF THE INVENTION

It is therefore an object of the present invention to provide a pit configuration of an optical information recording medium whereby the intensity of a light beam applied to and reflected from a front end portion of an information pit moving at high speed can be changed abruptly.

It is another object of the present invention to obtain sharp rising and falling edges of a signal read from an optical information recording pit.

It is a further object of the present invention to provide an optical information recording medium as above without making a pit width wider and a recording density lower, than those of a conventional medium.

According to one aspect of the present invention, in order to solve the above conventional problems and to achieve the most important technical subjects of both a decreased jitter of a readout signal and an improved recording density, the angle between a front face of each pit of a series of pits and a pit forming plane of a transparent substrate as well as the angle between the back face of each pit and the pit forming plane is made larger than that between a side face of each pit and the pit forming plane.

According to another aspect of the present invention, in a method of manufacturing an optical information recording medium having a step of applying a radiation beam modulated by a record signal to an original optical recording medium covered with a photoresist layer to thereby obtain a series of exposed pits corresponding to the record signal, the method comprises applying a radiation beam of a first intensity at the rise and fall edges of the record signal and applying a radiation beam of a second intensity at the intermediate area between the fall and rise edges, the first intensity being higher than the second intensity.

According to a further aspect of the present invention, the width of a pit whose length is shorter than a reproducing laser spot diameter is made larger than a minimum width of pits whose lengths are longer than the spot diameter.

According to an additional aspect of the present invention, an area of a pit having a length shorter than the diameter of a reproducing laser spot is equal to or larger than the area in said reproducing laser spot occupied by a pit having a longer length than the diameter of said reproducing laser spot.

According to a further aspect of the invention, an area at the bottom of a pit having a length shorter than the diameter of a reproducing laser spot is substantially equal to or larger than the area at the bottom in said reproducing laser spot occupied by a pit having a larger length than the diameter of said reproducing laser spot.

DESCRIPTION OF THE PREFERRED EMBODIMENTS

Figure 1A:
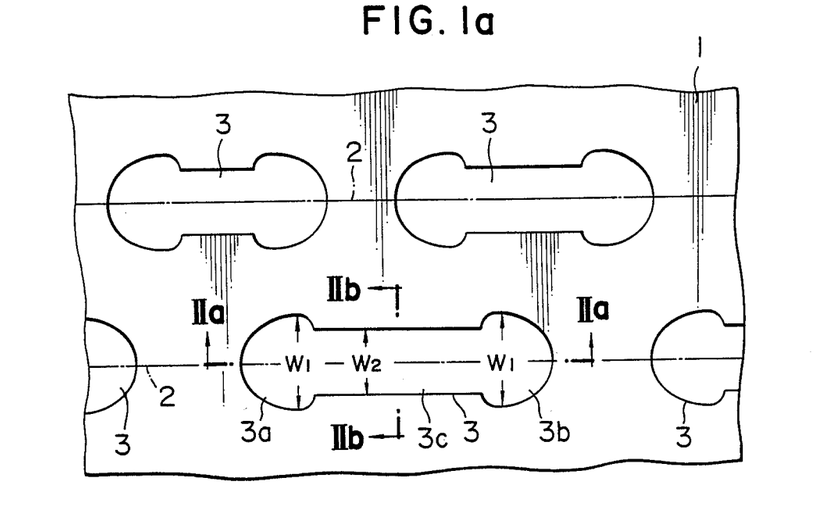
FIG. 1a is a partial plan view showing a pit configuration used in an optical information recording medium according to the present invention.
Figure 2A:
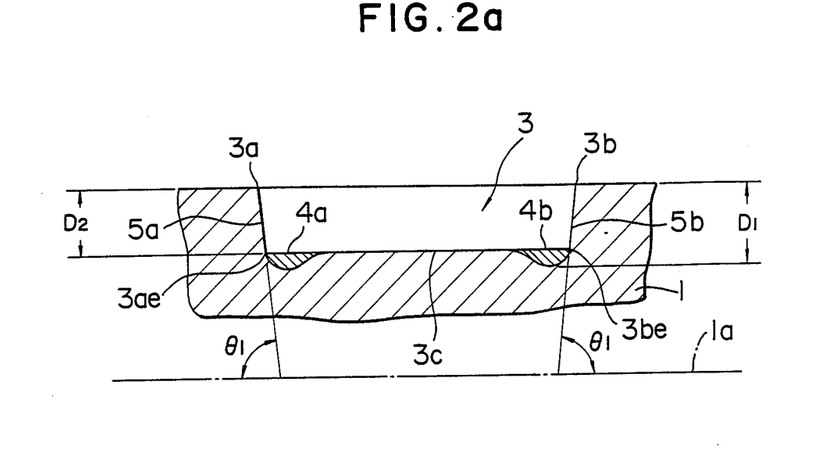
FIG. 2a is a sectional view along line IIa of FIG. 1.
Figure 2B:
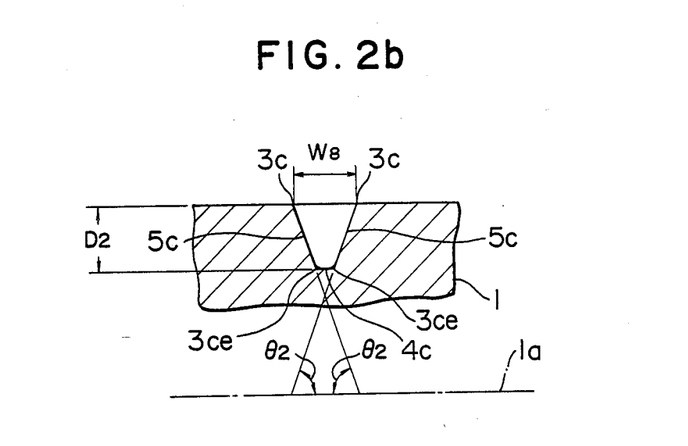
FIG. 2b is a sectional view along line IIb of FIG. 1.

FIG. 1a is a partial plan view showing a pit configuration used in an optical information recording medium according to the present invention, FIG. 2a is a sectional view along line IIa—IIa of FIG. 1a, and FIG. 2b is a sectional view along line IIb—IIb of FIG. 1a. In the Figures, reference number 1 denotes a disk substrate, reference number 2 denotes a series of pits or pit train disposed in correspondence with a record signal, and reference number 3 denotes a pit of the series of pits.

The disk substrate 1 is made of a transparent hard material, for example, glass, polycarbonate (PC), polymethyl methacrylate (PMMA) or epoxy. As a means for transferring a series of pits 2 to the disk substrate 1, various means may be employed which are suitable for the substrate material. A so-called 2P method is suitable for the disk substrate 1 made of glass. The injection molding is suitable for the disk substrate 1 made of thermoplastic polymeric material such as PC or PMMA. The cast molding is suitable for the disk substrate 1 made of thermoplastic polymeric material such as epoxy.

Each pit 3 of a series of pits 2 has a larger width W1 at the front and back end portions 3a and 3b as compared with a width W2 at the intermediate portion 3c therebetween, as shown in FIG. 1a. In order to obtain a maximum level of a readout signal at the front and back end portions 3a and 3b of each pit 3, the width W1 is set at about one third of a reproducing radiation spot diameter, e.g., it is set at a range from 0.46 micron to 0.6 micron if a reproduced radiation spot diameter of 1.6 micron is used.

The sectional configuration of a pit 3 is formed such that the angle $\theta 1$ is larger than the angle $\theta 2$, as shown in FIGS. 2a and 2b. The angle $\theta 1$ is defined by a front face 5a extending from the front end portion 3a to a bottom 4a of a pit and a pit forming plane 1a of the disk substrate 1, and by a back face 5b extending from the back end portion 3b to a bottom 4b of the pit and the pit forming plane 1a. The angle $\theta 2$ is defined by a side face 5c extending from the intermediate portion 3c to a bottom 4c and the pit forming plane 1a. In this case, if a radiation beam of a constant intensity is applied during a cutting operation to the disk substrate 1 at a linear velocity, the angle $\theta 1$ becomes substantially the same as an inclination angle $\theta 3$ shown in FIG. 11 at the portion where a maximum light exposure amount is applied, i.e., at the side face of the intermediate portion. The angle $\theta 1$ is 60 to 80 degrees, the angle $\theta 3$ is 45 to 56 degrees and the distance W9 between the line 44CE is 0.35 to 0.38 μm.

The depth of a pit can or may be set such that the depth D1 is larger than the depth D2, as shown in FIGS. 2a and 2b. The depth D1 is defined by a distance between the front end portion 3a to the bottom 4a of a pit 3, and by a distance from the back end portion 3b to the bottom 4b. The depth D2 is defined by a distance from the intermediate portion 3c to the depth 4c. In general, the depth may not be changed throughout the bottom of a pit and formed to have a uniform depth D2 which is one fourth the reproducing radiation beam wavelength. The distance W8 and the angle $\theta 2$ shown in FIG. 2b are 0.35 to 0.38 μm and 45 to 53 degrees, respectively.

In this embodiment of the optical information recording disk, a radiation beam of a constant intensity is applied during a cutting operation to the disk at a constant linear velocity. Therefore, the angle $\theta 1$ is made almost equal to the inclination angle $\theta 3$ of the pit side face. Thus, sharp rising and falling edges of a signal read from a pit 3 can be obtained and jitter of the readout signal can be reduced. Further, since the intermediate portion of a pit is made narrower, the pit width as a whole does not become wider than a conventional one, thus avoiding a low recording density.

In the above embodiment, an optical information recording disk without a pre-groove (guide groove) for tracking information has been used for the purpose of description. However, the gist of the present invention is not limited thereto and is applicable to such a disk having a pre-groove. Further, the depth of a pit may be made uniform throughout the bottom or made larger in part as described above. An optical information recording disk having a uniform depth may be achieved, for example, by applying a radiation beam to the bottom of a photoresist during the cutting operation of an original disk.

The width W1 at the front and back end portions 3a and 3b, the inclination angle $\theta 1$ at the front and back faces 5a and 5b, the width W2 at the intermediate portion 3c, and the inclination angle θ2 at the side face 5c can be adjusted by a light exposure amount (radiation beam intensity) during a cutting operation of an original disk. The following description will be directed to examples of an apparatus used for a cutting operation for an original optical disk and an exposure method for a pit by using such an apparatus.

Figure 4:
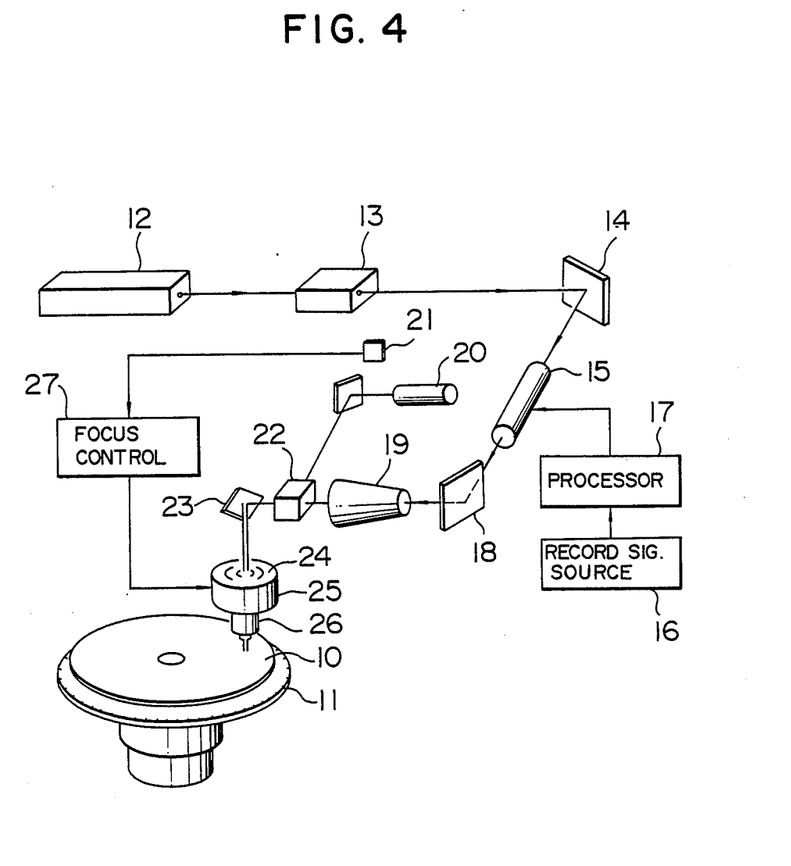
FIG. 4 is a perspective view showing the entire arrangement of an original optical disk cutting apparatus.

FIG. 4 is a perspective view showing the overall arrangement of an original optical disk cutting apparatus. The apparatus comprises: an original optical disk 10; a turn-table 11; a first radiation beam source 12; an A-O optical modulator 13; a reflective mirror 14; an E-O optical modulator 15; a record signal source 16 for the supply of a record signal to the E-O optical modulator; a processor 17 for the record signal source 16; a reflective mirror 18; a beam expander 19; a second radiation beam source 20; a half-mirror 21; a beam synthesizing prism 22; a reflective mirror 23; a cutting head 24; a focus actuator 25 equipped at the cutting head 24; an object lens 26 equipped at the cutting head 24; and a focus control circuit 27 for controlling the focus actuator.

The first radiation beam source 12 is used for exposing light to a photoresist coating the original optical disk 10. The second radiation beam source 20 having a wavelength outside of the photosensitive range of the photoresist, is used for the auto-focus adjustment of the focus actuator 25.

Figure 5:
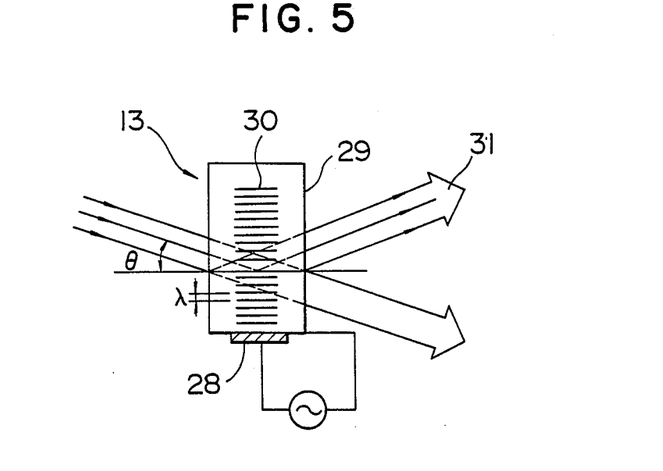
FIG. 5 is a diagrammatic view used for explaining the principle of an A-O optical modulator.

Referring to FIG. 5, the A-O optical modulator 13 is applied with a voltage at frequency f at its piezoelectric body 28 such as $LiNbO_3$ to generate a compressional wave 30 such as $TeO_2$ or $PbMoO_4$. The compressional wave 30 is used as a diffraction lattice to diffract a signal wave so that a modulated light 31 can be obtained through amplitude modulation of an ultrasonic drive voltage. In other words, by amplitude-modulating an ultrasonic drive voltage of the A-O optical modulator 13, it is possible to adjust the light exposure amount to the photoresist of the original optical disk 10.

Figure 6:
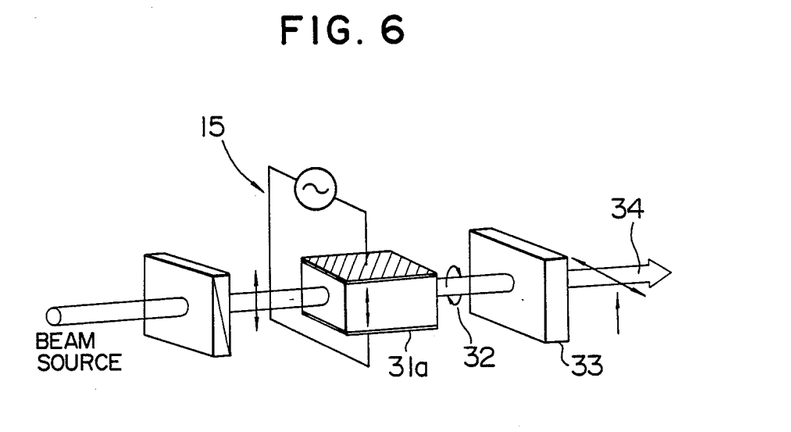
FIG. 6 is a perspective view used for explaining the principle of an E-O optical modulator.

Referring to FIG. 6, the E-O optical modulator 15 utilizes the phenomenon which if a voltage is applied to a Pockels cell 31a, there occurs anisotropy relative to the main axis of an index ellipsoid crystal so that two linearly polarized lights progressing within the crystal are caused to have a phase speed difference proportional to the electric field strength applied thereto. An elliptically polarized light 32 outputted from the Pockels cell 31a is passed to an analyzer 33 to obtain an amplitude-modulated light 34.

The beam expander 10 is a kind of collimator which expands a beam diameter so that the beam is incident to the whole area of the aperture of the objective lens 17 equipped at the cutting head 15.

Figure 7A:
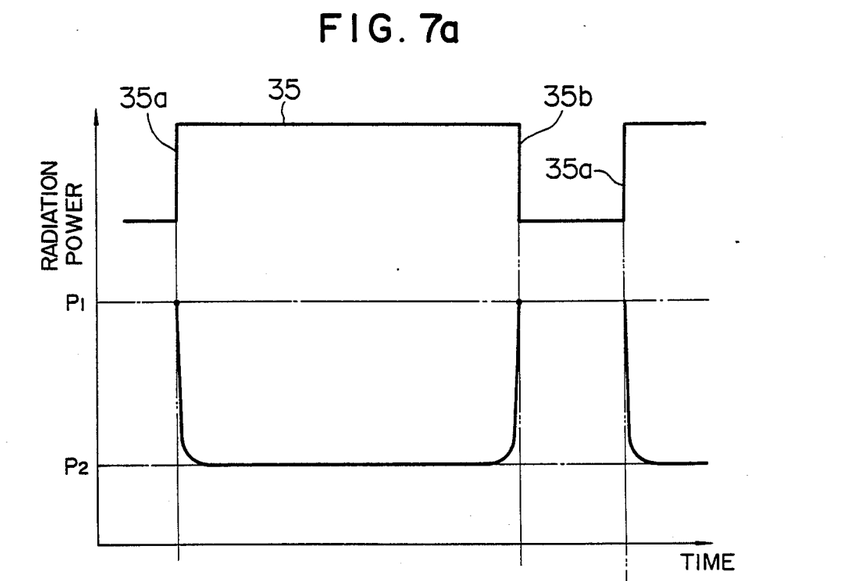
FIGS. 7a and 7b are graphs showing a relationship among rise and fall edges of a record signal, radiation beam intensity at an optical disk, and light exposure amount to a photoresist.
Figure 7B:
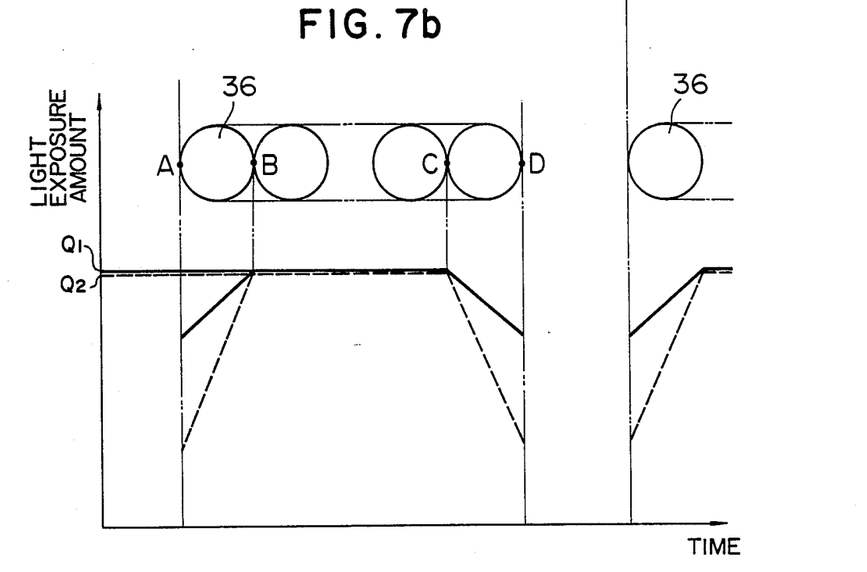

In order to effect a cutting operation for an original optical disk using the cutting apparatus as above, the turn-table 11 is rotated at a constant angular velocity with an original optical disk 10 mounted thereon. A radiation beam having a desired intensity obtained by amplitude-modulating an ultrasonic drive voltage of the A-O optical modulator 13 is applied to the photoresist formed on the surface of the disk 10. Particularly, as shown in FIG. 7a, a radiation beam having an intensity P1 is applied for a moment at the start point A corresponding to the rise edge 35a of a record signal 35. Immediately thereafter, the intensity of the radiation beam is reduced to a lower level than the initial intensity P1. The radiation beam at this lower intensity P2 is applied from the time immediately after the rise edge 35a to the time just before the fall edge 35b. A radiation beam having the same intensity P1 as at the start point A is applied at the end point D corresponding to the fall edge 35b to effect a cutting operation for the disk. Referring to FIG. 7b, the initial intensity P1 and the intermediate intensity P2 of a radiation beam are adjusted such that the light exposure amount at points B and C respectively spaced from the start and end points A and D by a spot diameter d can make the pit have a predetermined cutting width. Specifically, it is assumed that photoresists having a same sensitivity are used and that a pit having a same width as that obtained when a radiation beam of a constant intensity is applied to the photoresist at a constant linear velocity, is to be formed. In this case, the light exposure amount Q1 to the photoresist at points B and C respectively spaced apart from the start and end points A and D by a spot diameter d is adjusted to have almost the same amount as the light exposure amount Q2 used when a radiation beam of a constant intensity and a constant linear velocity is applied.

With the above light exposure method, it is possible to form the front and back end portions 3a and 3b having a wide width and a sharp inclination angle at the front and back faces 5a and 5b. The reason for this is that the initial light exposure amount of a radiation beam having an intensity P1 is added to the exposure amount during application of a radiation beam having an intensity P2 for a period corresponding to the spot diameter d, between the areas from the start point A to the point B, and from the point C to the point D. At the intermediate portion, since a low intensity radiation beam is applied and hence a small exposure amount is used, the pit width becomes narrower. In this case, as described previously, the intensities P1 and P2 have been determined such that the light exposure amount Q1 at the point B spaced apart from the start point A by the spot diameter d is almost the same amount as the light exposure amount Q2 used when a radiation beam having a constant intensity and a constant linear velocity is applied. Therefore, the pit width at the front and back end portions 3a and 3b is made to have almost the same width as that formed when a radiation beam having a constant intensity and a constant linear velocity is applied, thus avoiding a low recording density. At the intermediate portion 3c, a radiation beam is applied having a light exposure amount obtained by subtracting the light exposure amount Q2 at the start point A from the light exposure amount Q1 at the point B spaced apart from the point A by the spot diameter d.

Figure 3A:
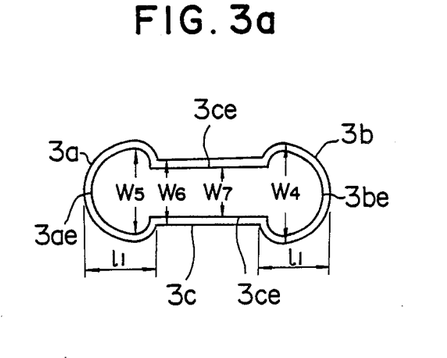
FIGS. 3a to 3e show various pit configurations in plan view.

The plan view of a pit according to the present invention, for example, shown in FIG. 2a takes a configuration as shown in FIG. 3a. Particularly, a difference in distance between front end 3a at the pit top plane and front end 3ae at the pit bottom, and between back end 3b at the pit top plane and back end 3be at the pit bottom, can be formed smaller than a difference in distance between pit side face portions 3c and 3ce. The lengths $l_1$, $W_4$ to $W_7$ are 0.35 to 0.45, 0.52 to 0.58, 0.40 to 0.44, 0.52 to 0.55 and 0.35 to 0.38 μm, respectively.

An optical information recording disk according to the present invention can be manufactured using an original optical disk by forming pits by means of the transfer technique.

Figure 1B:
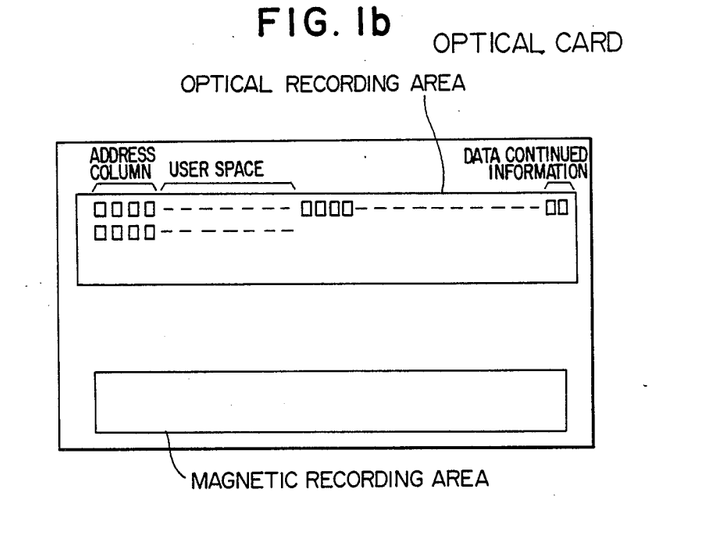
FIG. 1b is a plan view of an optical card.

The gist of the present invention resides in forming the sharp front and back end portions of a pit. By properly adjusting the intensity of a radiation beam at the intermediate portion within the area from the start point A to the end point D, it is possible to make the inclination at the side face of a pit 3 have the same inclination at the front and back faces, and also possible to make the width of a pit 3 at the intermediate portion 3c have the same width at the points B and C respectively spaced apart from the points A and D by the spot diameter d. Obviously, instead of the cutting apparatus shown in the embodiment, other known cutting apparatus may be used optionally. FIG. 1b shows an optical card having a rectangular shape and address and information pits formed in a similar manner as described above.

Of the pits formed by the above-described cutting apparatus, there is included a pit whose length is smaller than the diameter d of a reproducing laser spot. The pit includes at least one of the portions where the width is larger than that at the intermediate portion 3c, such as the front and back end portions 3a and 3b of a pit having a larger length than the laser spot diameter d. A minimum width W of a pit having a shorter length than the laser spot diameter d is larger than a minimum width W2 shown in FIG. 1 of a pit having a larger length than the diameter d. The sectional configuration of a pit 3 is formed such that the angle $\theta_1$ is larger than the angle $\theta_2$, as shown in FIGS. 2a and 2b. The angle $\theta_1$ is defined by a front face 5a extending from the front end portion 3a to a bottom 4a of a pit and a pit forming plane 1a of the disk substrate 1, and by a back face 5b extending from the back end portion 3b to a bottom 4b of the pit and the pit forming plane 1a. The angle $\theta_2$ is defined by a side face 5c extending from the intermediate portion 3c to a bottom 4c and the pit forming plane 1a.

Figure 3B:
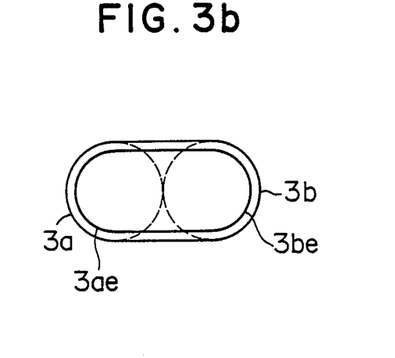
Figure 3C:
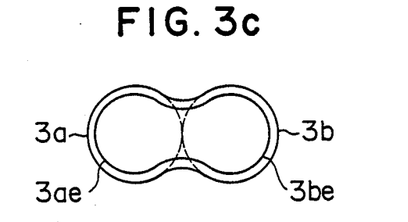
Figure 3D:
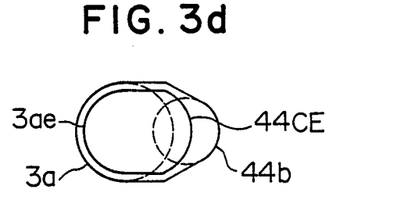

Various types of configuration of a pit effective in practical use and having a shorter length than the diameter of a reproducing radiation beam are shown in FIGS. 3b to 3d. In FIG. 3b, in order to form a pit having a shorter length than the spot diameter of the reproducing laser spot, the intensity of a reproducing radiation beam is not weakened at the intermediate portion as well as at the front and back end portions. A pit configuration shown in FIG. 3c is formed using the same cutting operation as with the pit shown in FIG. 1a. A pit configuration shown in FIG. 3d is formed by not applying a laser beam to the back end portion, the other area being formed in a similar manner to that for the pit shown in FIG. 3c. The shape at the back end portion of the pit shown in FIG. 3d is the same as that of a conventional pit shown in FIG. 13 and the spot diameter of the cutting laser beam is about 0.7 μm. The diameter of the cut pit will depend on the laser beam intensity, the sensitivity of the resist and the developer.

Figure 3E:
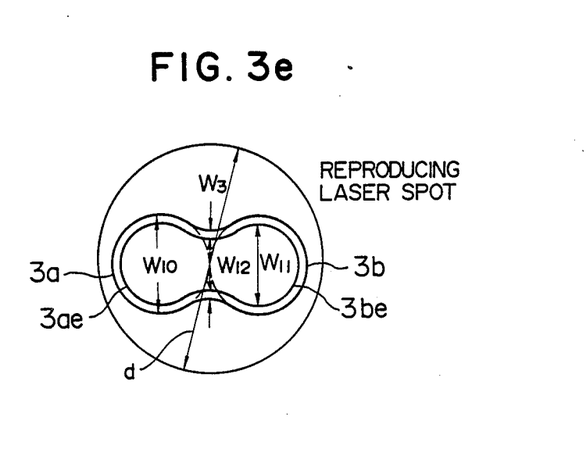

By adopting a pit configuration as above, the reproduced output signal level is not lowered even if the pit has a shorter length than the spot diameter. Therefore, information can be recorded on the area which has been heretofore considered not available because a stable output signal cannot be obtained therefrom due to a very short pit length. Thus, the present invention can improve recording density to a large extent. According to the experimental results, a stable output was obtained from a pit having a length of 0.60 micron using a reproducing radiation beam having a diameter of 1.6 micron, as shown in FIG. 3e. The lengths d, $W_{10}$, $W_{11}$ and $W_{12}$ are 1.5 to 1.6, 0.52 to 1.10, 0.35 to 0.97 and 0.35 to 0.97 μm, respectively.

Of course other pits of elliptic shape having the major axis orthogonal to the direction of the reproducing laser spot travelling on the optical medium can be utilized (not shown). These pits are made by using an original for mass-production prepared by using the cutting beam spot of elliptic shape having the major axis orthogonal to the cutting beam travelling direction.

It is preferable for such pits having the pit length or minor axis shorter than the reproducing laser spot diameter to determine the area of the pits substantially equal to the spot area of the reproducing laser beam. Thus, the area of the pits shorter than the reproducing laser spot diameter can be kept substantially constant in the original substrate cutting stage. The pit area is measured at the bottom of pits.

What is claimed is:

1. An optical information recording medium having on one side of a substrate a series of pits corresponding to a record signal, wherein the angle between a front face of each pit of said series of pits and a pit forming plane of said substrate, and the angle between a back face of each pit and said pit forming plane are made larger than the angle between a side face at an intermediate portion between said front and back faces along the entire length of said pit and said pit forming plane.

2. An optical information recording medium according to claim 1, wherein as seen from the top of said substrate, front and back end portions of said pit is made wider than said intermediate portion along the entire length of said pit, and said intermediate portion along the entire length of said pit is made narrowest.

3. An optical information recording medium according to claim 1, wherein said medium is made of a disk on which said series of pits are arranged circumferentially.

4. An optical information recording medium according to claim 1, wherein a maximum width of each of said front and back end portions of said pit is the same as that at said intermediate portion of said pit.

5. An optical information recording medium according to claim 1, wherein a minimum width of a pit having a length smaller than the diameter of a reproducing laser spot is made larger than a minimum width of a pit having a length larger than the diameter of said reproducing laser spot.

6. An optical information recording medium according to claim 1, wherein a maximum width of a pit having a length smaller than the diameter of a reproducing laser spot is made larger than a maximum width of a pit having a length larger than the diameter of said reproducing laser spot.

7. An optical information recording medium according to claim 1, wherein a minimum width at the bottom of a pit having a length smaller than the diameter of a reproducing laser spot is made larger than a minimum width at the bottom of a pit having a length larger than the diameter of said reproducing laser spot.

8. An optical information recording medium according to claim 1, wherein a maximum width at the bottom of a pit having a length smaller than the diameter of a reproducing laser spot is made larger than a maximum width at the bottom of a pit having a length larger than the diameter of said reproducing laser spot.

9. An optical information recording medium according to claim 1, wherein a maximum width of each of said front and back end portions at the bottom of said pit is the same as that at said intermediate portion at the bottom of said pit.

10. An optical information recording medium according to claim 1, wherein the area of a pit having a length shorter than the diameter of a reproducing laser spot is equal to or larger than the area in said reproducing laser spot occupied by a pit having a longer length than the diameter of said reproducing laser spot.

11. An optical information recording medium according to claim 1, wherein the area at the bottom of a pit having a length shorter than the diameter of a reproducing laser spot is substantially equal to or larger than the area at the bottom in said reproducing laser spot occupied by a spot having a longer length than the diameter of said reproducing laser spot.

12. An optical information recording medium according to claim 1, wherein the width at the bottom of a pit having a length shorter than the diameter of a reproducing laser spot is made equal to or larger than the width at the bottom of a pit having a length longer than the diameter of said reproducing laser spot.

13. An optical information recording medium according to claim 1, wherein said medium is of a rectangular shape and an optical information record pit train is formed on said medium.

14. An optical information recording medium according to claim 1, wherein a maximum width of each of said front and back end portions at the bottom of said pit is made wider than that at said intermediate portion at the bottom of said pit.

15. An optical information recording medium according to claim 1, wherein each pit of said series of pits has a pit length shorter than a diameter of a reproducing radiation beam spot.

16. An optical information recording medium according to claim 15, wherein an area of each of said pits having said shorter pit length is made substantially equal to an area appearing with said reproducing radiation beam spot of a pit having a pit length longer than the diameter of said reproducing laser beam.

17. An optical information recording medium according to claim 16, wherein said area of a pit is a value measured at a bottom of said pit.

18. In a method of manufacturing an optical information recording medium having a step of applying a radiation beam modulated by a record signal to an original optical information recording medium covered with a photoresist layer to thereby obtain a series of exposed pits corresponding to the record signal, said method comprising applying a radiation beam of a high intensity at the rise and fall edges of said record signal; and making the width of a pit having a length shorter than the diameter of a reproducing laser spot, wider in inverse proportion to said pit length.

19. In a method of manufacturing an optical information recording medium according to claim 18, wherein each of said pits has an elliptic shape.

20. In a method of manufacturing an optical information recording medium having a step of applying a radiation beam modulated by a record signal to an original optical information recording medium covered with a photoresist layer to thereby obtain a series of exposed pits corresponding to the record signal, the method comprises applying a radiation beam of a first intensity at least at one of the rise and fall edges of said record signal and applying a radiation beam of a second intensity at the intermediate portion between the fall and rise edges, the first intensity being higher than the second intensity, wherein each of said exposed pits have an elliptic shape having a major axis orthogonal to a recording track of said original optical information recording medium.

21. An original medium used for manufacturing an optical information recording medium, wherein the angle between a front face of an optical information recording pit and a pit forming plane is made larger than those angles at the remaining faces of said pit.

22. An optical information recording medium according to claim 1, wherein said medium is an original medium used for manufacturing an optical information recording medium.

23. An optical information recording medium according to claim 22, wherein each pit is formed by exposure of said optical information recording medium to a radiation beam modulated by a record signal.

24. An original medium according to claim 21, wherein said optical information recording pit is formed in response to exposure of said optical information recording medium by a radiation beam modulated by a record signal.

25. In a method of manufacturing an optical information recording medium according to claim 19, wherein said elliptic shape of each of said pits has a major axis orthogonal to a recording track of said original optical information medium.

* * * * *